Aug. 29, 1939.   F. X. LAMB   2,171,183
MAXIMUM DEMAND INDICATOR
Filed Feb. 14, 1936   2 Sheets-Sheet 1

Inventor:
Francis X. Lamb,
By Potter, Pierce & Scheffler,
Attorneys.

Aug. 29, 1939.　　　　F. X. LAMB　　　　2,171,183
MAXIMUM DEMAND INDICATOR
Filed Feb. 14, 1936　　2 Sheets-Sheet 2
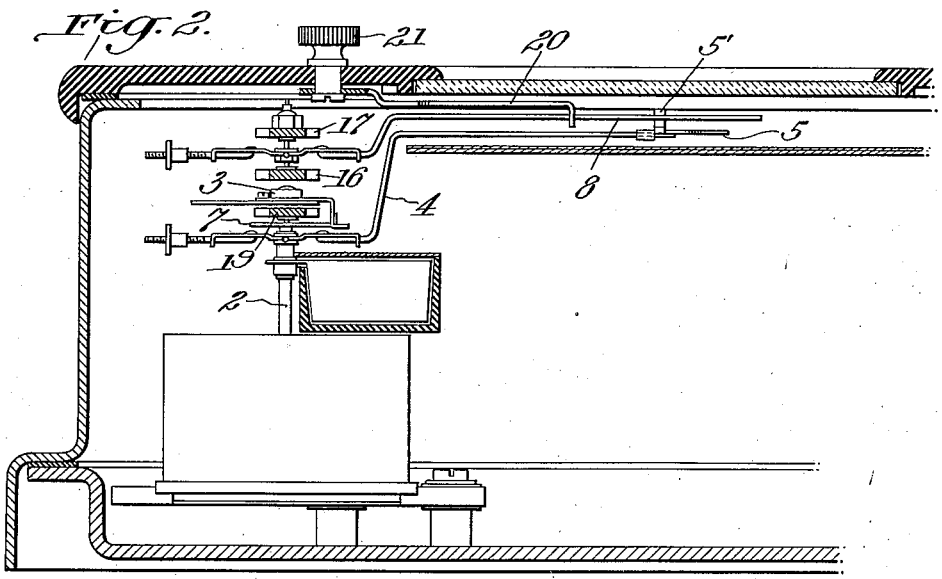
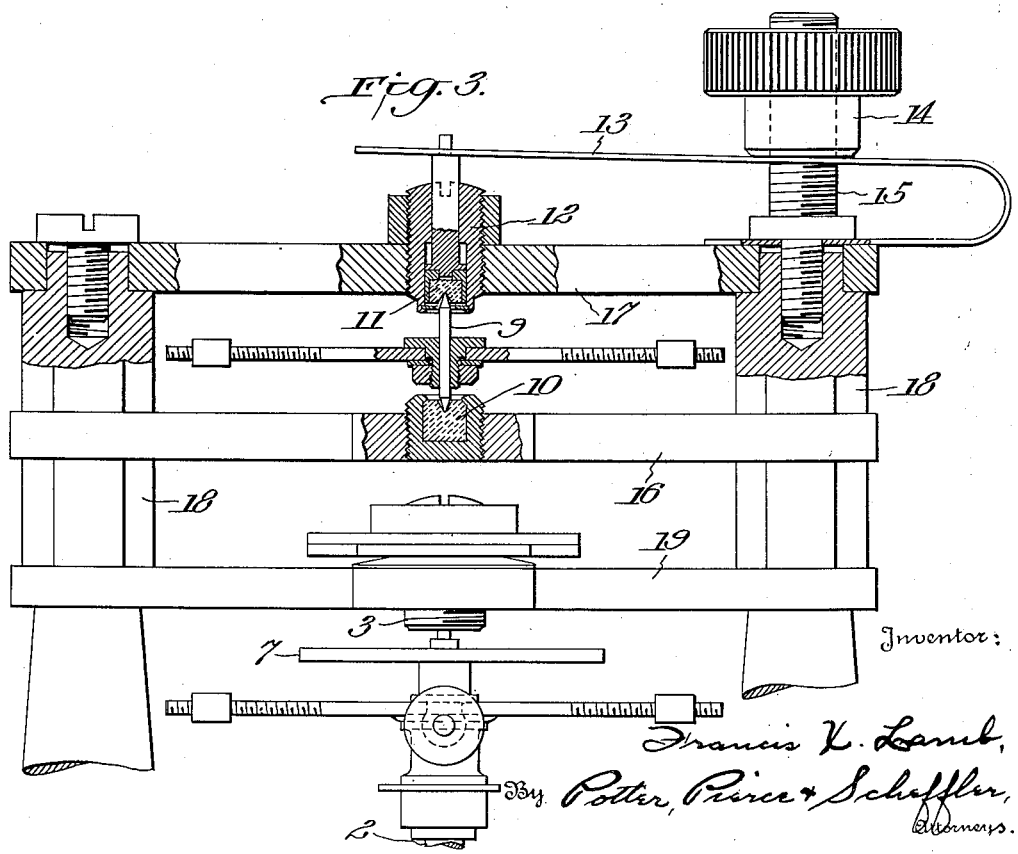

Patented Aug. 29, 1939

2,171,183

UNITED STATES PATENT OFFICE

2,171,183

MAXIMUM DEMAND INDICATOR

Francis X. Lamb, East Orange, N. J., assignor to Weston Electrical Instrument Corporation, Newark, N. J., a corporation of New Jersey Application February 14, 1936, Serial No. 63,970

5 Claims. (Cl. 116—129)

This invention relates to maximum demand indicators and more particularly to maximum demand indicators for use with sensitive measuring instruments, the general arrangement being such that a pivotally mounted indicating arm is carried forward by the instrument pointer but is frictionally retained in its position of maximum displacement to provide a record of the maximum reading of the instrument.

It has been the practice to use materials having a high coefficient of friction, with a light contact pressure, to obtain the frictional resistance to displacement of the auxiliary pointer or indicating arm. Various arrangements of friction disks or ratchets and light springs have been employed, but none has been entirely satisfactory. The problem of obtaining the required frictional resistance to movement, but without preventing normal movement of the main instrument pointer, has been particularly difficult in electrical measuring instruments in which, in gentral, relatively small forces are available for effecting the movement of the indicating system.

An object of this invention is to provide a maximum demand or peak load pointer which is reliable in operation and which does not place an undue burden on the indicating system of a measuring instrument. An object is to provide a maximum demand indicator arm mounted for movement on surfaces having a low coefficient of friction, with adjustable elements for forcing those surfaces together under high pressure to obtain the desired frictional resistance to movement of the indicator arm. A further object is to provide a maximum demand indicator arm pivotally mounted in jewel bearings, and an adjustable spring for establishing a heavy pressure between the indicator arm pivots and the bearings.

These and other objects and advantages of the invention will be apparent from the following specification when taken with the accompanying drawings, in which:

Fig. 2 is a fragmentary sectional view of the indicator system and the auxiliary maximum demand indicator arm;

Fig. 3 is a fragmentary and enlarged sectional view of the support for the maximum demand indicator arm.

Figure 1:
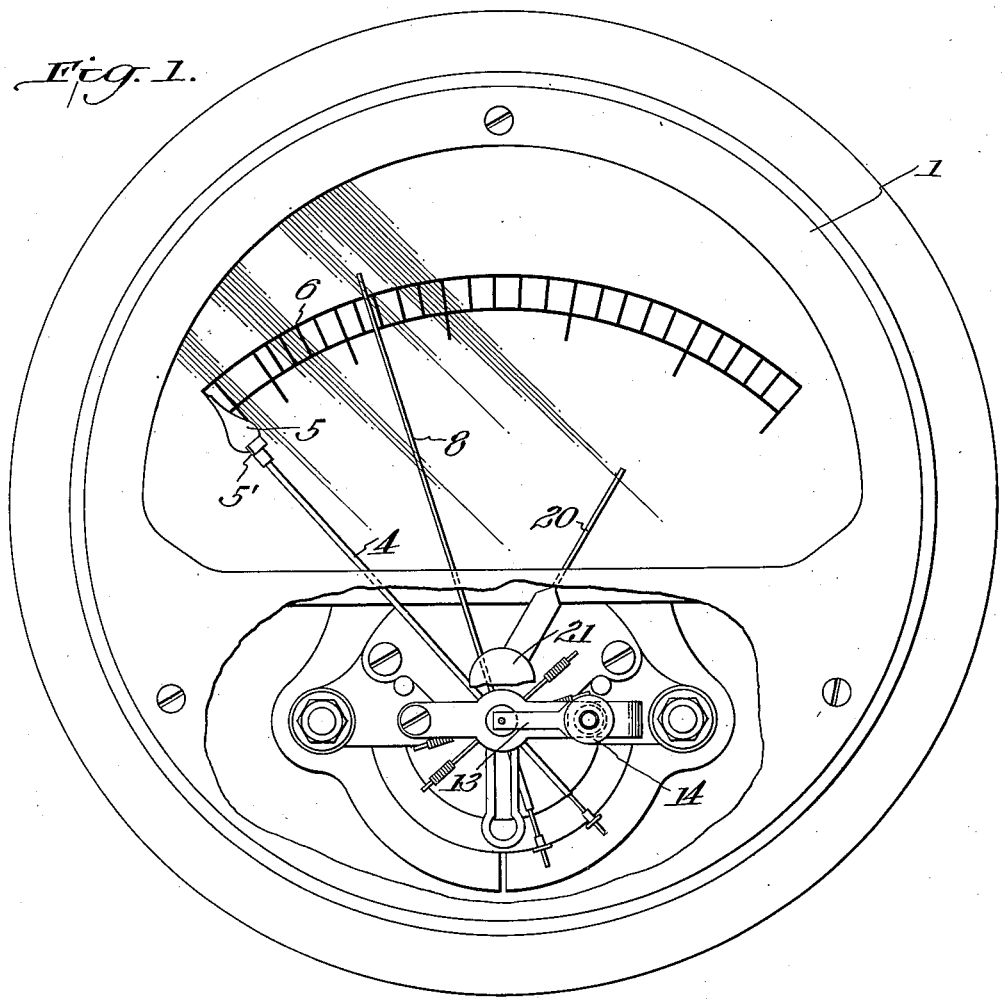
Fig. 1 is an elevation, with parts broken away, of an electrical measuring instrument which is a typical embodiment of the invention.

In the drawings, the reference numeral 1 identifies an instrument casing within which is arranged an electrical measuring system that has a staff 2 pivotally mounted in a lower bearing, not shown, and an upper jewel bearing 3. The staff 2 carries an indicating arm 4 that terminates in a pointer 5 which moves over a graduated scale 6, the arm and pointer being urged towards zero position by a torsion spring 7. The force which displaces the pointer 5 may be developed by various mechanisms in accordance with the particular electrical quantity to be measured and, for purposes of illustration, an alternating current voltmeter construction is indicated in Fig. 1. The invention is not restricted, however, to this type of electrical measuring instrument or to electrical measuring instruments since the angular or other displacement of the main indicating arm may be effected by other electrical or physical mechanism.

Figure 4:
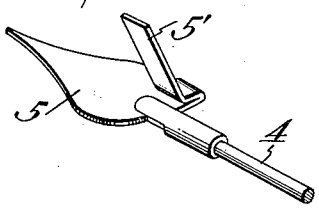
Fig. 4 is a fragmentary perspective view of the pointer.

The auxiliary or maximum demand indicator arm 8 is preferably mounted for the same type of movement as that of the indicator arm 4, (in the illustrated case for pivotal movement); and extends into the path of movement of some part of the main indicator. As best shown in Fig. 4, the pointer 5 of the indicator arm may have an integral lug 5' which rises above the path of movement of arm 4 to engage the arm 8. The arm 8 is carried by a staff 9 which is mounted in a fixed lower bearing 10 and an upper bearing 11 which is slidably supported in a bushing 12 and yieldingly urged towards the lower bearing by a spring 13. The bearings 10, 11 are of the usual jewel bearing type, being cupped to provide seats for the sharpened ends of the staff 9. The frictional resistance to rotation of shaft 9 may be closely regulated to any desired value by adjustment of the nut 14 on the threaded stud 15 which extends through the spring 13. A fixed support for the lower bearing 10 and the bushing 12 is provided by the bridges 16, 17 that are mounted on spacing members 18, 18 which extend above the usual instrument bridge 19 that carries the upper instrument bearing 3.

The maximum demand indicator arm 8 may be reset to any desired point on scale 6 by a resetting arm 20 which is carried by a small shaft 21 which extends through the upper wall of the casing.

Although the bearings in which the pivot 9 is mounted are of the type which, under the normal conditions of use, present substantially no resistance to the angular movement of the staff 9, the pressure exerted by spring 13 is adjusted to introduce a substantial frictional resistance. The unit pressures on the minute contact areas at the ends of the pivot 9 may be relatively low or may run to exceedingly high values, but less than that which would crush the pivot, when the spring 13 is adjusted to provide the required amount of frictional resistance. The actual frictional resistance to displacement of the maximum demand indicator arm 8 may be closely regulated to any desired value in accordance with the design of the particular instrument movement with which it is associated.

While the particular measuring instrument herein illustrated is of the electrical type having a pivoted pointer, it will be apparent that the invention may be applied to other instruments having indicating arms or pointers which are displaced angularly or rectilinearly by any type of moving system.

I claim:

1. In a measuring instrument of the type including a moving system having an indicating member; a maximum demand indicating arm, means including cooperating surfaces having a low coefficient of friction supporting said indicating arm for movement by said indicating member, and means forcing said cooperating surfaces into contact to produce a substantial frictional resistance to movement of said indicator arm.

2. In a measuring instrument of the type including a moving system having a pivotally mounted indicating element; a maximum demand indicator arm movable by said indicator element, a staff carrying said arm, a fixed and a movable bearing supporting said staff for movement about an axis coinciding with the pivotal axis of the instrument indicating element, said bearings and staff having a low coefficient of friction, and spring means forcing said bearings towards each other to create a substantial frictional resistance to pivotal movement of said staff and indicating arm.

3. In a measuring instrument of the type including a moving system having a pivotally mounted indicator element, a maximum demand indicator arm, a staff carrying said arm, jewel bearings supporting said staff for pivotal movement thereof by the indicator element about an axis coinciding with that of the indicator element, and means forcing said bearings into contact with said staff to establish a substantial frictional resistance to angular movement of said staff and indicator arm.

4. In a measuring instrument having a moving system pivotally supported by bridge means and carrying an indicator element, a pair of bridges spaced from each other and from the moving system, a jewel bearing and a bushing carried by the respective bridges in axial alinement with the pivotal axis of the instrument moving system, a second jewel bearing slidably mounted in said bushing, a staff supported by said jewel bearings, a maximum demand indicator arm carried by said staff, and spring means forcing said second bearing into engagement with said staff to create a substantial frictional resistance to angular movement of said staff in said bearings.

5. The invention as claimed in claim 4, in combination with means adjustable to control the pressure exerted by said spring means upon said second bearing.

FRANCIS X. LAMB.